E. W. GOSLINE.
AUTOMOBILE SLEIGH.
APPLICATION FILED MAR. 15, 1910.
1,012,627.
Patented Dec. 26, 1911.
2 SHEETS—SHEET 1.
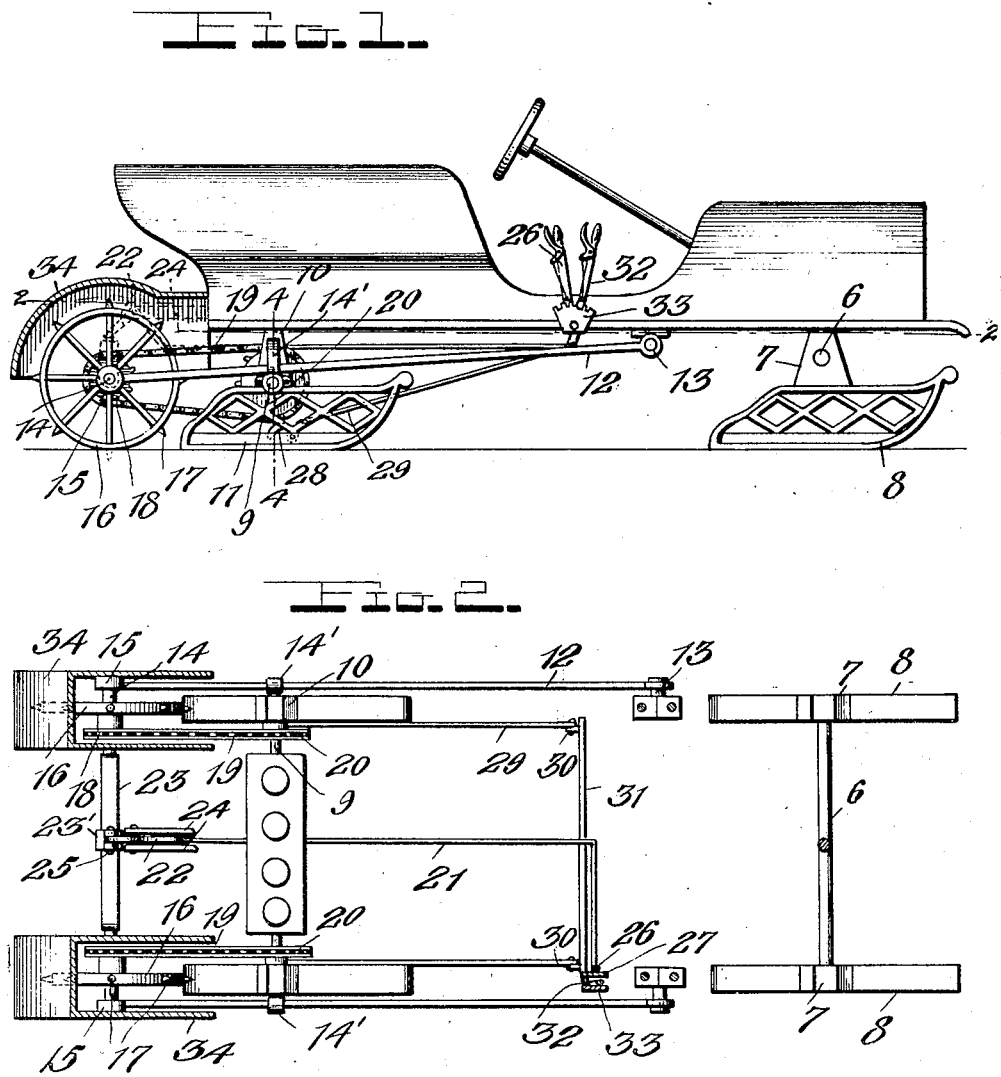
Witnesses
Chas. L. Griesbauer.
E. M. Ricketts
Inventor
E. W. Gosline,
By Watson E. Coleman
Attorney

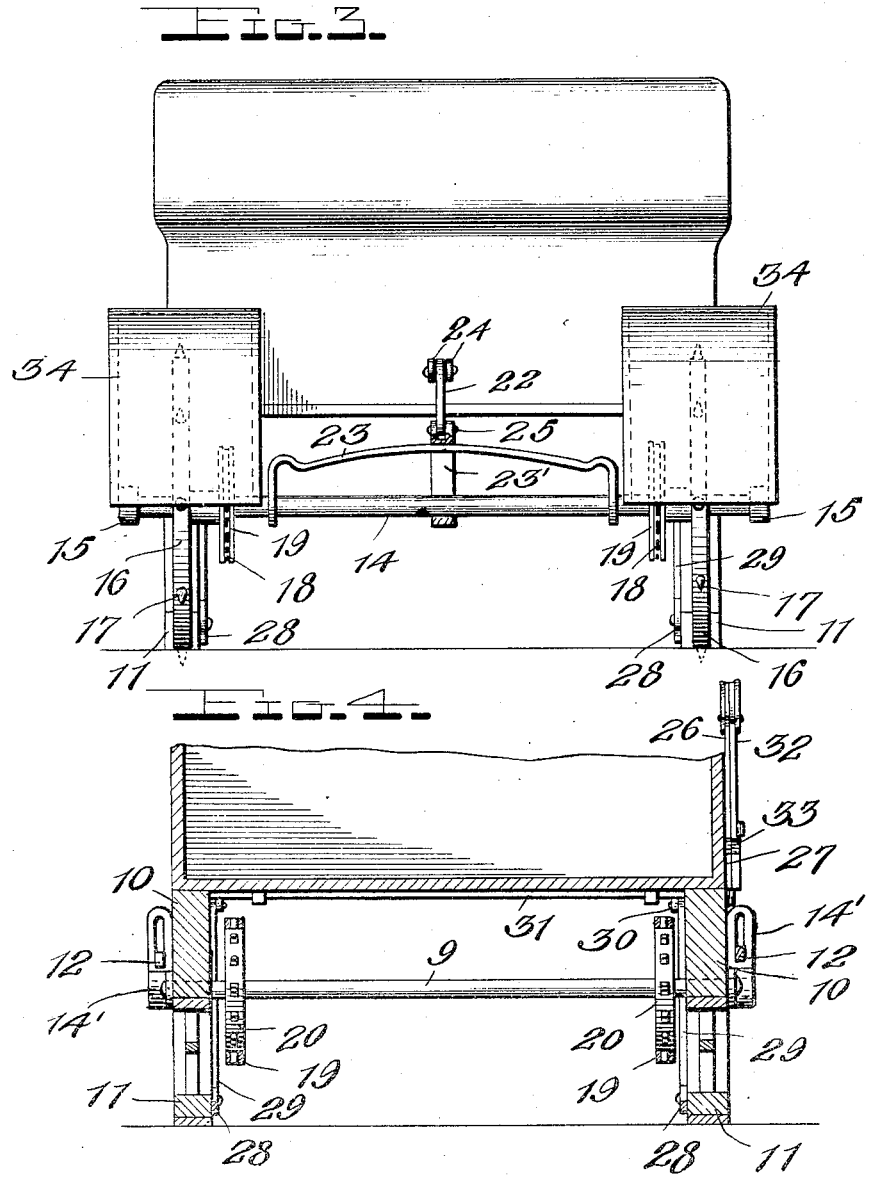

UNITED STATES PATENT OFFICE.

EDWARD W. GOSLINE, OF GEMMELL, MINNESOTA.

AUTOMOBILE SLEIGH.

1,012,627.  Specification of Letters Patent.  Patented Dec. 26, 1911.

Application filed March 15, 1910. Serial No. 549,446.

*To all whom it may concern:*

Be it known that I, EDWARD W. GOSLINE, a citizen of the United States, residing at Gemmell, in the county of Koochiching and State of Minnesota, have invented certain new and useful Improvements in Automobile Sleighs, of which the following is a specification, reference being had to the accompanying drawings.

This invention relates to certain new and useful improvements in automobile sleighs and has for its object to provide a self propelled motor vehicle of the above type which contains certain novel features of construction whereby the machine will be rapidly propelled over snow or ice.

Another object is to provide an auto sleigh which is of comparatively simple construction whereby the driving means may be elevated out of contact with the ground so that the machine will move forwardly of its own weight when on an incline.

A further object is to provide braking means carried by the rear runners and operated by a manually actuated lever mounted upon the body of the machine whereby the speed of the same may be controlled or the machine entirely stopped.

A still further object is to provide new and novel means for mounting the driving mechanism and also to provide means whereby said mechanism may be elevated out of contact with the ground so that the machine may remain stationary without necessitating the stopping of the motor.

With the above and other objects in view, the invention consists of the novel features of construction and the combination and arrangement of parts hereinafter fully described and claimed, and illustrated in the accompanying drawings, in which—

Figure 1 is a side elevation of an automobile sleigh constructed in accordance with the present invention; Fig. 2 is a section taken on the line 2—2 of Fig. 1; Fig. 3 is a rear end elevation; and Fig. 4 is a section taken on the line 4—4 of Fig. 1.

Referring to the drawings 5 indicates a body which may be of any preferred form. Secured beneath the forward end of this body is a stationary transverse axle 6. The ends of this axle are mounted in the sleigh knees 7, the lower ends of which are connected to or secured upon the front runners 8. A power shaft 9 has its ends mounted in the sleigh knees 10 which are carried by the rear runners 11 and upon which the body 5 is supported.

Bars 12 are pivoted at their forward ends to the bottom of the machine body at the opposite sides thereof, as shown at 13. These pivotal connections are preferably located in advance of the central portion of the body, as clearly shown in Fig. 1. The arms 12 extend rearwardly at an inclination to the body and the ends of the transverse connecting rod or shaft 14 are rotatably mounted in the bearings 15. A guide member 14' is loosely arranged on each end of the shaft 9 and secured to the knees 10 and prevents transverse movement of the arms 12 which extend therethrough. The extremities of the shaft extend beyond the arms and have mounted thereon the drive wheels 16, which are preferably mounted upon ball bearings and are disposed directly behind and in line with the rear runners 11. Each of these drive wheels is provided with a plurality of outwardly extending spurs 17, upon its periphery whereby the wheels securely engage with the ground surface and are prevented from slipping or skidding thereon. The drive wheels 16 have integrally formed therewith or securely connected thereto the sprockets 18. These sprockets are disposed upon the inner faces of the guide wheels and are connected by means of the endless chains 19 to similar sprockets 20 on the power shaft 9. Power is imparted to the power shaft through means of a suitable engine or motor carried in the body of the machine.

At times it is desirable to elevate the rear driving wheels 16 out of contact with the ground surface and to accomplish this purpose I provide the body 5 with the central rearwardly extending arms 24. A bell crank lever 22 is pivotally secured between the outer ends of these arms. The rear end of the bell crank lever is disposed between the ears 25 formed upon the upper end of a supporting bar 23' which is secured at its lower end upon the rear transverse shaft 14. One end of the lever extends forwardly and downwardly and has pivotal connection to the rear end of a rod 21. The forward end of this rod is secured to the inner end of a transverse crank shaft mounted in bearings under the body of the machine. The crank shaft is adapted to be rotated by an operating lever 26. This lever carries the usual spring controlled dog which engages with the teeth of a rack segment 27 secured to the side of the body of the vehicle. In this manner it will be seen that when the operating lever 26 is grasped by the operator and moved forwardly, the drive wheels 16 and the axle 14 will be moved upwardly out of contact with the ground surface through the medium of the bell crank lever 22 and the longitudinally extending rod 21. A spring 23 is secured at its ends to the shaft 14, and extends through a slot formed in the vertical supporting bar 23'.

In order to bring the machine to a stop or to check its speed, I provide the brake shoes 28, which are pivotally mounted upon the inner edges of each of the rear runners 11 and are connected by means of the rods 29 to the laterally extending arms 30 which are integrally formed upon the transversely positioned rod 31 mounted in bearings beneath the body 5. An operating lever 32 is rigidly secured to one end of this rod and carries a spring controlled dog which is adapted to engage with the teeth of the rack segment 33, whereby said lever is held in its adjusted position. A protective casing or guard 34 is also provided whereby the body of the vehicle will be protected against flying particles of snow, ice and mud.

From the foregoing it is believed that the construction and operation of the machine will be readily understood without requiring a ore extended description. By positioning the drive wheels 16, in the rear of the machine body and connecting the axle 14 to the body by means of the longitudinal bars 12 the forward ends of which are pivotally connected to the body beyond its longitudinal center, the power derived from the driving axle 9 is evenly distributed between the rear and forward ends of the machine, the drive wheels 16, securely engaging with the ground surface and cutting through the snow or ice by means of the spurs 17 on the periphery of said wheels. Thus the machine is forwardly propelled. Vibration of the body of the machine due to the contact of the drive wheels with the ground is reduced to a minimum owing to the fact that these wheels are positioned in the rear of the body and not immediately beneath the passengers' seats.

The machine is of comparatively simple construction, may be manufactured at a low cost and is extremely durable and efficient in its operation.

While I have shown and described what I believe to be the preferable embodiment of the invention it will be obvious that numerous minor modifications may be resorted to without departing from the spirit or sacrificing any of the advantages thereof.

Having thus described the invention, what is claimed as new is:

1. In an automobile sleigh, the combination with a body, of front and rear runners disposed beneath said body to support the same, bars pivoted at one end upon the sleigh body and extending rearwardly therefrom at opposite sides, a transverse revoluble shaft connecting the ends of said bars, driving wheels mounted on said shaft adjacent to each end thereof, a power shaft mounted on the rear runners, sprockets on said shaft, sprockets carried by the driving wheels, endless chains connecting said sprockets with the sprockets on said shaft, means arranged upon the body to support said transverse shaft, means for elevating said driving wheels, and guides for said pivoted bars secured to the rear runners.

2. In an automobile sleigh, the combination with a body, of front and rear runners disposed beneath said body, to support the same, bars pivoted upon the sides of the body and extending rearwardly thereof at its opposite sides, a transverse revoluble shaft secured in the rear ends of said bars, spurred driving wheels mounted on said shaft, adjacent to the bars, arms centrally secured to the rear of the body, a bell crank lever pivoted between said arms, a supporting bar on the revoluble shaft and pivoted to one end of said bell crank lever, a rod extending centrally beneath the body connected to the other end of said lever, the other end of said rod being connected to an adjusting lever mounted on the body of the machine to elevate said driving wheels, a power shaft mounted on the rear runners, means for driving said wheels, and a guide member secured to each of the rear runners, said pivoted rods being movable in the guide members.

In testimony whereof I hereunto affix my signature in the presence of two witnesses.

EDWARD W. GOSLINE.

Witnesses:
J. M. SHERMAN,
J. LEON WALL.